Patented Jan. 11, 1949

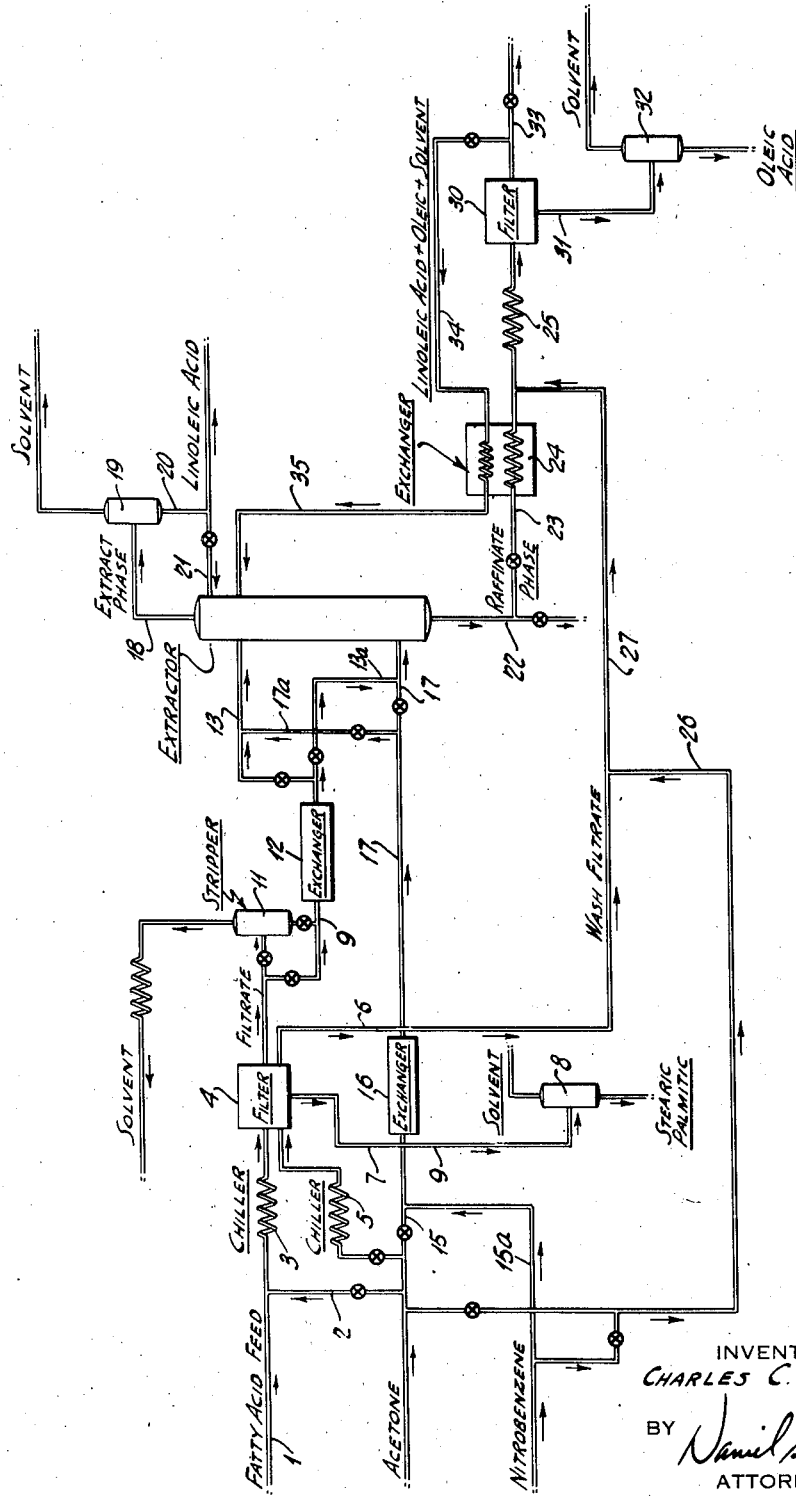

2,459,054

UNITED STATES PATENT OFFICE 2,459,054

FATTY ACID SEPARATION

Charles C. Towne, Beacon, N. Y., assignor to The Texas Company, New York, N. Y., a corporation of Delaware Application July 17, 1945, Serial No. 605,610

3 Claims. (Cl. 260—419)

1

This invention relates to the separation of fatty oil substances into their components by a method which involves a combination of filtration and liquid phase extraction.

Broadly, the invention contemplates effecting fractional separation of a fatty oil substance comprising solidifiable saturated constituents and unsaturated constituents of differing degrees of unsaturation. The method involves precipitating saturated components of the feed mixture by dilution with an organic solvent liquid, and filtration of the precipitated material from the mixture to form a filtrate comprising unsaturated constituents of the feed. This filtrate, either with or without removal of the solvent liquid, is subjected to liquid phase extraction with additional solvent liquid or with a different solvent liquid so as to form liquid extract and raffinate phases. The extract phase comprises the relatively unsaturated constituents dissolved in the main body of solvent liquid, while the raffinate phase comprises relatively less unsaturated constituents mixed with a portion of the solvent. The two phases are separately removed and the solvent liquid may be removed therefrom.

According to a modification of the invention, the liquid phase extraction may be carried out under conditions so as to obtain a rough degree of separation between the desired components of the unsaturated fatty oil mixture. In such case, the resulting raffinate phase, with or without the addition of more solvent liquid, is cooled or chilled to a temperature at which the less unsaturated component or components are precipitated. The resulting cold mixture is then subjected to filtration to separate the precipitated constituents and produce a filtrate comprising the more unsaturated component or components dissolved in solvent liquid. This secondary filtration is thus employed to obtain a more clear cut separation between components of the unsaturated portion of the feed.

It is contemplated that the filtrate from this secondary filtration may be recycled to the extraction zone, as will be described later in more detail.

The invention is applicable to the treatment of fatty compounds or substances derived from either animal or vegetable sources. The fatty components or substances may consist of fatty acids and compounds derived from fatty acids which possess the characteristic carbon chain found in fatty acids. Among such compounds are fatty acid esters, fatty amides, fatty nitriles, fatty amine salts, glycerides and the like.

2

The invention is effective for the fractional separation of fatty acid mixtures such as derived from soy-bean oil, cottonseed oil, etc., and which mixtures consist essentially of palmitic, stearic, oleic and linoleic acids.

A feature of the invention involves precipitating a saturated constituent such as stearic and palmitic acids from such a fatty acid mixture with an organic solvent liquid such as acetone, and filtering out the precipitated saturated acids prior to liquid phase extraction to produce a filtrate consisting essentially of the unsaturated acids. This filtrate, after removal of all or part of the solvent liquid if desired, is then subjected to liquid phase extraction to effect separation between oleic and linoleic acids.

As already indicated, another feature of the invention involves utilizing the liquid phase extraction step as an adjunct to a subsequent and secondary filtering operation for the purpose of obtaining a more clean cut separation between the fatty acids. Thus, the extraction step is used to reduce the concentration of the most unsaturated constituent or constituents in the mixture prior to the secondary filtration step. In this way the secondary filtration permits a clean cut separation of the residual unsaturated constituents into fractions of predetermined character, that is with respect to the melting point range, iodine value, etc.

In order to describe the invention in more detail, reference will now be made to the accompanying drawing which comprises a flow diagram illustrating the application of the invention to the treatment of a fatty acid mixture comprising about 50% linolenic acid, 30% oleic acid, 5% stearic acid, and about 8% palmitic acid, the mixture being characterized by having an iodine number of about 140.

Referring to the drawing, the fatty acid feed mixture is drawn from a source not shown through a pipe 1 and mixed with a solvent liquid such as acetone or other low boiling ketone drawn from a source not shown through a pipe 2. The fatty acid feed and acetone are mixed in the proportion of about 2 to 3 volumes of acetone to 1 volume of fatty acid feed. The resulting mixture is then passed through a chiller 3 wherein it is chilled to a temperature of about $-5°$ F. or to a temperature in the range about 0 to $-10°$ F.

Advantageously the fatty acid mixture may be mixed initially with about 0.7 to 1.5 volumes of solvent liquid per volume of fatty acid mixture, and this mixture chilled to the aforesaid temperature, following which the remainder of the solvent liquid prechilled to about the same temperature is added and mixed therewith.

In any case, the resulting chilled mixture of acids and solvent liquid is passed from the chiller 3 to a filter 4, advantageously of the continuous rotary drum type. The filtration may be effected under vacuum and at the aforesaid temperature of about —5° F.

There is thus produced a filter cake consisting essentially of stearic and palmitic acids and a filtrate consisting essentially of the unsaturated acids dissolved in the solvent liquid.

The filter cake is subjected to washing with additional solvent liquid in situ as is customary in the conventional filter practice. This wash solvent is advantageously chilled to about the filtering temperature in a chiller 5 prior to introduction to the filter. Also, the wash filtrate is advantageously kept separate from the main filtrate and separately removed from the filter through a dosage pipe 6 to which reference will be made later. The purpose of this washing is to remove mother liquor from the filter cake prior to discharge from the filter. The filter cake is discharged from the filter through a pipe 7 and may be passed to a stripper 8 wherein retained solvent is stripped from the stearic and palmitic acids, the solvent free material having an iodine number of not more than about 5.

The primary filtrate discharged from the filter 4 and consisting of the unsaturated acids dissolved in solvent liquid is conducted through a pipe 9 to an extractor 10. The filtrate may be passed first to a stripper 11 wherein part or all of the solvent liquid is removed prior to passage to the extractor. This stripping is practiced when the same type of solvent is used in the subsequent extraction.

Also, the temperature of the filtrate or stripped filtrate may be adjusted by passage through the heat exchanger 12 prior to introduction to the extractor 10.

If the stripped filtrate is extracted with acetone, it is introduced to the upper part of the extraction tower through a pipe 13. An additional quantity of acetone is conducted through a pipe 15 and a heater or heat exchanger 16 and introduced through a pipe 17 to the lower portion of the extractor 10.

When the solvent liquid used in the extractor 10 is of greater density than the fatty acid mixture being charged thereto, such as nitrobenzene, furfural, aniline, phenol, etc., the points of introduction of fatty acid mixture and solvent are reversed. In such case, the solvent, such as nitrobenzene, is drawn from a source not shown through pipe 15a, exchanger 16, pipe 17, and introduced through pipe 17a to the upper portion of extractor 10, while the filtrate, either without the aforesaid stripping, or with either partial or complete stripping of the initial solvent, is passed through pipe 13a to the lower portion of the extractor.

The stream of acetone introduced to the lower portion of the extractor is caused to rise countercurrently to the descending body of filtrate so as to effect countercurrent extraction. Temperature conditions are maintained at about 70 to 150° F. within the extractor so that formation of extract and raffinate phases takes place.

The extract phase accumulating in the upper portion of the extractor comprises the most unsaturated constituent, namely linoleic acid dissolved in the major portion of the solvent liquid. This extract phase is drawn off continuously through a pipe 18 to a stripper 19 wherein the solvent is stripped from the acid.

The solvent-free acid or substantially solvent-free acid is drawn off through a pipe 20 from which it may be discharged from the system. Advantageously a portion of the solvent-free or substantially solvent-free acid is recycled to the top of the tower through branch pipe 21 to provide a back wash therein for the purpose of displacing oleic acid from the phase mixture accumulating in the top of the tower. In this way it is possible to draw off an extract stream consisting essentially of linoleic acid dissolved in solvent liquid. After removal of the solvent, the linoleic acid is of about 99% purity.

The raffinate phase collecting in the bottom of the extractor 10 comprises mainly oleic acid, and is drawn off through a pipe 22 and may be discharged from the system.

However, in accordance with the invention the raffinate phase stream is passed through a branch pipe 23 to a heat exchanger 24 wherein it is cooled and from there passed through a cooler or chiller 25. Prior to introduction to the chiller 25, the raffinate phase is mixed with additional solvent liquid. When the same solvent is used in the extraction as in the primary filtration, this additional solvent liquid advantageously comprises wash filtrate discharged from the primary filter through pipe 6 and to which reference has previously been made. On the other hand, fresh solvent may be added through pipes 26 and 27.

Conditions may be maintained in the extractor 10 so that the unsaturated acid contained in the raffinate phase passing through the pipe 22 will comprise about 95% oleic acid and 5% linoleic acid. The solvent present in the raffinate phase mixture may amount to about 20% by volume. Accordingly, fresh solvent or wash filtrate is added through the pipe 27 so as to provide a mixture passing to the chiller comprising about 3 or 4 volumes of solvent to 1 volume of unsaturated acids.

This mixture is chilled to a temperature of about —60° F., and the resulting chilled mixture passed to a filter 30 wherein a filter cake is obtained which consists of substantially pure oleic acid.

The filter cake is discharged through a pipe 31 to a stripper 32 wherein the solvent is stripped from the oleic acid.

The filtrate produced in the filter 30 is drawn off through a pipe 33 and contains a mixture of linoleic acid and oleic acid dissolved in solvent liquid. This filtrate is advantageously conduced through a pipe 34 into the aforesaid heat exchanger 24 wherein it is used to precool the aforesaid raffinate phase mixture passing to the secondary filtration. The filtrate mixture after passage through exchanger 24 is conducted through pipe 35 to the upper portion of the extractor 10 and in this way recycled.

While mention has been made of operating the extractor 10 so as to produce a raffinate mixture of unsaturated acids containing 95% oleic acid, nevertheless it is contemplated that the operation may be conducted so as to produce a mixture in which the linoleic acid may amount to 25 or 30%. From the standpoint of the secondary filtration, it is desirable that the ratio of linoleic acid to oleic acid be not substantially greater than about 1 volume of linoleic to 4 volumes of oleic.

The filter 30 may be operated in substantially the same manner as the filter 4 so that the filter cake is subjected to washing in situ with additional solvent liquid.

Mention has been made of using acetone as a common solvent. However, it is contemplated that a different solvent liquid may be used in the extraction and secondary filtration steps. Other solvent liquids besides acetone may be used such as methylethyl ketone, acetonitrile, liquid sulfur dioxide, alcohols, and various mixtures of solvent liquids.

Obviously many modifications and variations of the invention as above set forth may be made without departing from the spirit and scope thereof, and therefore only such limitations should be imposed as are indicated in the appended claims.

I claim:

1. In the fractional separation of a higher fatty acid mixture comprising oleic and linoleic acids substantially free from saturated acids, the method which comprises extracting said mixture with a low boiling aliphatic ketone in an extraction zone at a temperature in the range of about 70 to 150° F., forming as a result of said extraction, an extract phase rich in linoleic acid, and a raffinate phase in which linoleic acid ranges from about 5 to 25% of the oleic acid present therein, and containing a relatively small proportion of solvent, separately removing said phases, adding an additional quantity of said solvent to remove raffinate phase thereby forming a mixture comprising about 1 volume of unsaturated fatty acid and about 3 to 4 volumes of solvent, chilling the resulting mixture of raffinate phase and solvent to about minus 60° F. to precipitate oleic acid in substantially pure form, filtering chilled raffinate phase to remove precipitated acid as a filter cake, and forming a filtrate comprising solvent and residual linoleic acid, removing said filter cake and recycling resulting filtrate to said extraction zone.

2. In the fractional separation of a higher fatty acid mixture comprising oleic and linoleic acids substantially free from saturated acids, a method which comprises extracting said mixture with acetone in an extraction zone at a temperature in the range of about 70 to 150° F., forming as a result of said extraction an extract phase rich in linoleic acid and a raffinate phase in which linoleic acid ranges from about 5 to 25% of the oleic acid present therein and containing a relatively small proportion of solvent, separately removing said phases, adding an additional quantity of said solvent to remove raffinate phase thereby forming a mixture comprising about one volume of unsaturated fatty acid and about three to four volumes of solvent chilling resulting mixture of solvent and raffinate phase to a temperature of about minus 60° F. to precipitate oleic acid in substantially pure form, removing precipitated acid from the chilled liquid mixture of solvent and residual linoleic acid, and recycling, at least in part, said chilled mixture from which the precipitate has been removed to said extraction zone.

3. In the fractional separation of a fatty acid mixture comprising oleic and linoleic acids substantially free from saturated acids, the method which comprises passing a stream of said fatty acid mixture to the upper portion of an extraction tower, introducing a stream of low boiling ketone to the lower portion of said tower, causing fatty acid and solvent to flow countercurrently through said tower, maintaining said tower at a temperature in the range of about 70 to 150° F., withdrawing from the top of said tower an extract phase rich in linoleic acid, withdrawing from the bottom of said tower a raffinate phase containing mainly oleic acid, and in which linoleic acid is present in an amount ranging from about 5 to 25% of the oleic acid, separately removing said phases, adding an additional quantity of said solvent to withdrawn raffinate phase thereby forming a mixture comprising about one volume of unsaturated fatty acid and three to four volumes of solvent, chilling the resulting mixture to a temperature of about −60° F., to precipitate oleic acid in substantially pure form, removing precipitated acid from the chilled liquid mixture of solvent and residual linoleic acid, and recycling said chilled mixture from which the precipitate has been removed to the upper portion of said extraction tower.

CHARLES C. TOWNE.

REFERENCES CITED

The following references are of record in the file of this patent:

UNITED STATES PATENTS

| Number | Name | Date |
|---|---|---|
| 2,045,727 | Rider | June 30, 1936 |
| 2,111,360 | Cutting | Mar. 15, 1938 |
| 2,113,960 | Grote et al. | Apr. 12, 1938 |
| 2,293,676 | Myers et al. | Aug. 18, 1942 |
| 2,360,860 | Morris et al. | Oct. 24, 1944 |

OTHER REFERENCES

Hartsuch, J. Am. Chem. Soc., vol. 61, May 1939, pp. 1142–44.